(12) United States Patent
Bourgeois et al.

(10) Patent No.: US 11,186,124 B2
(45) Date of Patent: Nov. 30, 2021

(54) TIRE WITH IMPROVED PERFORMANCES HAVING CUTS WITH A PROTUBERANCE THAT LOCALLY REDUCE A WIDTH OF A CUT IN THE TREAD

(71) Applicant: COMPAGNIE GENERALE DES ETABLISSEMENTS MICHELIN, Clermont-Ferrand (FR)

(72) Inventors: Frédéric Bourgeois, Clermont-Ferrand (FR); Fabien Hellot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 202 days.

(21) Appl. No.: 16/496,526

(22) PCT Filed: Apr. 4, 2018

(86) PCT No.: PCT/FR2018/050846
§ 371 (c)(1),
(2) Date: Sep. 23, 2019

(87) PCT Pub. No.: WO2018/185436
PCT Pub. Date: Oct. 11, 2018

(65) Prior Publication Data
US 2020/0376897 A1 Dec. 3, 2020

(30) Foreign Application Priority Data
Apr. 4, 2017 (FR) .................................. 1770337

(51) Int. Cl.
*B60C 11/12* (2006.01)
*B60C 11/03* (2006.01)
(Continued)

(52) U.S. Cl.
CPC ........ *B60C 11/1218* (2013.01); *B60C 11/033* (2013.01); *B60C 11/1281* (2013.01);
(Continued)

(58) Field of Classification Search
CPC .............. B60C 11/033; B60C 11/1218; B60C 11/1259; B60C 11/1281; B60C 2011/0016; B60C 2011/0025
See application file for complete search history.

(56) References Cited

U.S. PATENT DOCUMENTS

| 2008/0161475 A1* | 7/2008 | York | B60C 1/0016 |
| | | | 524/494 |
| 2011/0056601 A1* | 3/2011 | Ebiko | B60C 11/005 |
| | | | 152/209.16 |
| 2013/0158185 A1* | 6/2013 | Thompson | C08L 19/006 |
| | | | 524/526 |
| 2013/0206298 A1* | 8/2013 | Guillermou | B60C 11/12 |
| | | | 152/209.18 |

(Continued)

FOREIGN PATENT DOCUMENTS

FR 3 041 568 3/2017
JP 02-303908 A * 12/1990

(Continued)

OTHER PUBLICATIONS

Translation for Japan 02-303908 (Year: 2021).*
Machine translation for WO 2019/102148 (Year: 2021).*
Machine translation for Japan 2007-099061 (Year: 2021).*

*Primary Examiner* — Steven D Maki
(74) *Attorney, Agent, or Firm* — Cozen O'Connor

(57) ABSTRACT

Passenger vehicle tire, the tread having edge parts (11), provided with a plurality of transversely or obliquely oriented cuts (3) having a width at most equal to 2 mm and a depth at least equal to 75% of the thickness of the tread that is intended to be worn away, more than half of the cuts (3) comprising a protuberance that locally reduces the width of the cut (3) to a width at least equal to 0.2 mm and at most equal to 0.5 mm. The tread material which comes into contact with the road surface in the new state has a Shore A hardness at least equal to 48 and at most equal to 57, a loss (Continued)

at 60° C. at least equal to 12% and at most equal to 20%, a glass transition temperature Tg at least equal to −20° C. and at most equal to −10° C.

12 Claims, 2 Drawing Sheets

(51) Int. Cl.
  *B60C 9/20* (2006.01)
  *B60C 11/00* (2006.01)
  *B60C 11/13* (2006.01)
(52) U.S. Cl.
  CPC ... *B60C 11/1259* (2013.01); *B60C 2009/2064* (2013.01); *B60C 2011/0016* (2013.01); *B60C 2011/0025* (2013.01); *B60C 2011/1338* (2013.01)

(56) References Cited

U.S. PATENT DOCUMENTS

| | | | |
|---|---|---|---|
| 2013/0306209 A1* | 11/2013 | Bonnamour | B60C 11/1281 152/209.21 |
| 2014/0251519 A1* | 9/2014 | Piffard | B60C 11/0318 152/209.5 |
| 2016/0237259 A1 | 8/2016 | Hardy | |

FOREIGN PATENT DOCUMENTS

| | | |
|---|---|---|
| JP | H 04 345504 | 12/1992 |
| JP | 2007-099061 A * | 4/2009 |
| WO | WO 2001/60642 | 8/2001 |
| WO | WO 2011/073312 | 6/2011 |
| WO | WO 2011/073313 | 6/2011 |
| WO | WO 2015/185395 | 12/2015 |
| WO | WO-2019/102148 A1 * | 3/2019 |

* cited by examiner

TIRE WITH IMPROVED PERFORMANCES HAVING CUTS WITH A PROTUBERANCE THAT LOCALLY REDUCE A WIDTH OF A CUT IN THE TREAD

RELATED APPLICATIONS

This is a U.S. National Phase Application under 35 USC 371 of International Application PCT/FR2018/050846 filed on Apr. 4, 2018.

This application claims the priority of French application no. 1770337 filed Apr. 4, 2017, the entire content of which is hereby incorporated by reference.

FIELD OF THE INVENTION

The present invention relates to tires for passenger vehicles and more particularly to the treads of these tires.

Definitions:

The reference conditions of the tire on its mounting rim as defined by the E.T.R.T.O. European standard specify the inflation pressure corresponding to the maximum admissible load-bearing capacity of the tire indicated by its load index and its speed rating. However, the use conditions of a tire on a vehicle differ from the reference conditions in that the load borne is equal to around 80% of the maximum admissible load.

The contact patch of the tire with the road surface is obtained for the tire at a standstill and mounted on a rim and under use conditions. The total contact area under these conditions is denoted S, this area being equal to the total area delimited by the external contour of the contact patch of the tire under its reference conditions; this total area includes the recessed parts.

A block is a raised element formed on a tread, this element being delimited by voids or grooves and comprising at least two lateral walls and a contact face, the latter contact face being intended to come into contact with the road surface when the tire is running.

A rib is a raised element formed on a tread, this element being delimited by two grooves. A rib comprises two lateral walls and a contact face, the latter being intended to come into contact with the road surface.

A radial direction means a direction which is perpendicular to the axis of rotation of the tire (this direction corresponds to the direction of the thickness of the tread).

An axial or transverse direction means a direction parallel to the axis of rotation of the tire.

A circumferential direction means a direction tangential to any circle centred on the axis of rotation. This direction is perpendicular both to the axial direction and to a radial direction.

A cut denotes either a groove or a sipe and corresponds to the space delimited by walls of material that face one another and are at a mean distance from one another, this mean distance being able to be zero. It is precisely this distance that distinguishes a sipe from a groove; in the case of a sipe, this distance is appropriate for allowing the opposing walls to come into at least partial contact when in the contact patch in which the tire is in contact with the road surface. As a general rule, on the tire in the new state, this distance, for a sipe intended for a passenger vehicle tire, is at least equal to 2 millimetres (2 mm). In the case of a groove, the walls of this groove cannot come into contact with one another when running under use conditions.

BACKGROUND OF THE INVENTION

It is known practice to provide a tread of a tire intended to be fitted on a car with a plurality of circumferentially and transversely oriented grooves, these grooves delimiting a plurality of raised elements forming a tread pattern. The external surface of these elements forms a tread surface intended to come into contact with a road surface during running. The grooves and sipes form a visible tread pattern on the tread surface in the new state. As the tire wears down, this pattern can be maintained or can change.

In order to remedy a loss of stiffness associated with the presence of cuts, the document WO2001/60642 describes cuts with a width at most equal to 2 mm and having, on a part of their surface, a part that forms a protuberance and locally reduces the width of the sipe.

However, it has been noted that, in use, with this type of tire, foreign bodies could pass into the sipes, these foreign bodies then being able to travel towards the internal reinforcing structure of the tire, this potentially having a negative effect over time from the standpoint of tire endurance.

SUMMARY OF THE INVENTION

One object of the present invention is to reduce this risk and to develop a combination that is particularly resistant in use.

To this end, one aspect of the invention is directed to a passenger vehicle tire having a tread formed from at least one material that comes into contact with a road surface while the tire is running via a tread surface forming the external surface of the tread, this tread having edge parts axially delimiting said tread, at least one of these edge parts being provided with a plurality of transversely or obliquely oriented cuts, these cuts having a depth at least equal to 75% of the thickness of the tread that is intended to be worn away, more than half of the cuts formed in the edge parts comprise at least one protuberance that locally reduces the width of the cut to a width at least equal to 0.2 mm and at most equal to 0.5 mm. This width of the cut is measured on a new tire inflated to its service pressure.

This tire, when it is new, is such that the material of the tread which is intended to come into contact with the road surface has the following physical characteristics:

its Shore A hardness, measured in accordance with standard ASTM 2240 or DIN 53505, is at least equal to 48 and at most equal to 57, its loss at 60° C., a loss of energy at 60° C. by rebound at a set energy level measured at the sixth impact and the value of which, expressed in %, is the difference between the energy supplied and the energy returned, divided by the energy supplied, is at least equal to 12% and at most equal to 20%, its glass transition temperature Tg, measured in accordance with standard ASTM D 5992-96, is at least equal to −20° C. and at most equal to −10° C.

A material that satisfies the claimed conditions of Shore A hardness, loss of energy and glass transition temperature Tg can be obtained within the family of materials that formed the subject matter of the patent application published under the reference WO 2015/185395-A1.

The glass transition temperature Tg of an elastomer compound, which is the temperature at which the elastomer compound passes from a deformable rubbery state to a rigid glassy state, is generally determined during the measurement of the dynamic properties of the elastomer compound, on a viscosity analyser (Metravib VA4000), in accordance with standard ASTM D 5992-96. The dynamic properties are measured on a sample of vulcanized elastomer compound, that is to say elastomer compound that has been cured to a degree of conversion of at least 90%, the sample having the form of a cylindrical test specimen having a thickness equal to 2 mm and a cross-sectional area equal to 78.5 mm². The response of the sample of elastomer compound to a simple alternating sinusoidal shear stress, having a peak-to-peak amplitude equal to 0.7 MPa and a frequency equal to 10 Hz, is recorded. A temperature sweep is carried out at a constant temperature rise rate of +1.5° C./min. The results utilized are generally the complex dynamic shear modulus G*, comprising an elastic part G' and a viscous part G", and the dynamic loss tgδ equal to the ratio G"/G'. The glass transition temperature Tg is the temperature at which the dynamic loss tgδ reaches a maximum during the temperature sweep.

By virtue of this combination, it is possible to reduce the wedging forces if stones pass into a sipe, notably under low-temperature running conditions.

A cut is oriented obliquely on a tire once the angle of the line of the cut on the tread surface of the tread to the transverse direction is at most equal to 45 degrees.

It is specified that when a cut is provided with at least one protuberance that locally reduces its width to a width at least equal to 0.2 mm and at most equal to 0.5 mm, the area taken up by all the protuberances formed in a cut is at least equal to 20% and at most 80% of the area of one of the faces delimiting said cut, and preferably between 30 and 50%. It is specified that the reference area of the face delimiting the cut is measured in the part of the cut that interacts in the contact patch in which the tire is in contact with the road surface. The local reduction in width of the cut to a width at least equal to 0.2 mm and at most equal to 0.5 mm locally converts this cut into a sipe, the opposing faces of which come into contact in the contact patch in which the tire is in contact with the road surface when running.

Preferably, the protuberance(s) of a cut is/are located between a depth of 15% and a depth of 70% of the maximum depth of the cut in order to provide the tire with efficiency and durability.

In one variant, the protuberance(s) is/are formed on one and the same face delimiting the cut.

It is also possible to combine the presence of a plurality of cuts provided with protuberances with another plurality of cuts not provided with such protuberances.

If the Shore A hardness is less than 48, the capacity of the bottom of the cuts to withstand attacks is considerably weakened. Specifically, it has been found that rubbers of low Shore hardness withstand attacks poorly and become worn very quickly, this potentially happening once small stones have been captured in a sipe.

If the Shore A hardness measured at 23° C. is greater than 57, the contact forces between the walls of a sipe and any stone passing into the sipe are increased. This will be reflected in an increase in the mean dimension of the stones that will not be ejected during running. The larger the dimensions of these stones, the earlier the phenomenon of sipe bottom attack starts in the life of the tire, and this can have a negative effect over time from the standpoint of tire endurance and can thus affect the durability of performance.

If the loss at 60° C. is less than 12%, the performance level of the tire in terms of wet grip is poorer and no longer satisfies the desired balance of performance on current and future tires.

If the loss at 60° C. is greater than 20%, the adhesion between the stone and the opposing walls increases, resulting in the same drawback as described above when the Shore hardness is greater than 57.

If the glass transition temperature Tg is less than −20° C., the tire is too much of a winter tire, this not being desired for common use (all seasons).

If the glass transition temperature Tg is greater than −10° C.: during cold periods, the stiffness of the material increases, resulting in the same drawback as described above when the Shore hardness is greater than 60. Moreover, large stones can remain trapped in the sipes.

Preferably, the Shore A hardness is at least equal to 50 and at most equal to 56.

Preferably, the loss at 60° C. of the material of the tread is at least equal to 15% and at most equal to 20%. This makes it possible to obtain the desired performance while retaining the performance compromise of modern tires including, notably, a good wet grip performance.

Advantageously, the glass transition temperature Tg of the material of the tread is at least equal to −16° C. and at most equal to −12° C. This Tg range is well adapted to the climatic conditions in temperate countries, in which temperatures below zero occur sporadically. This makes it possible to obtain the desired performance while retaining the performance compromise of modern tires including, notably, a good wet grip performance in cold weather.

The total thickness of tread to be worn away is understood here as being the maximum thickness measured between the tread surface in the new state of the tread and the wear limit indicators required by legislation. These wear limit indicators have a height measured with respect to the bottom of the grooves of 1.6 mm in Europe. The total thickness to be worn away is obtained from the difference between the depth of the grooves and the height of the wear limit indicators.

Preferably, the sipes formed in the edges of the tread have a width at most equal to 1 mm in order to increase the capacity of these sipes to close when in the contact patch in which the tire is in contact with the road surface.

Further features and advantages of the invention will become apparent from the description given below with reference to the appended drawings which show, by way of non-limiting example, an embodiment variant of the subject matter of the invention.

DETAILED DESCRIPTION OF THE FIGURES

Figure 1:
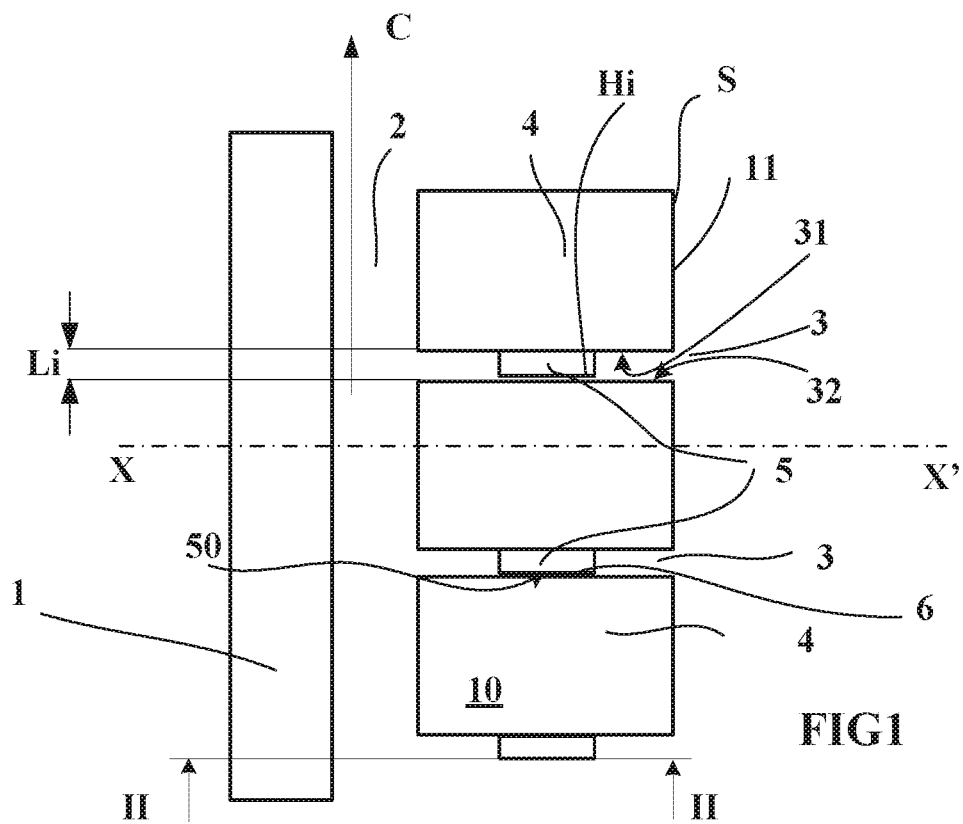
FIG. 1 shows a schematic partial plan view of a tread according to an embodiment of the invention, this tread comprising a protuberance in each transverse cut formed in the edges of this tread.

FIG. 1 shows a partial plan view of a tread surface 10 of a tread 1 and more particularly of an edge part 11 of the tread 1 of a tire for use on a passenger vehicle according to the invention.

It is apparent from this FIG. 1 that the edge part 11 is delimited axially on the inside by a circumferentially oriented groove 2 of appropriate width for remaining open in the contact patch. The depth of this circumferential groove 2 is designed such that when the wear limit is reached, this groove can still act to evacuate water present on a road surface in wet weather. Consequently, this depth is greater than the thickness of material of the tread that is intended to be worn away during running.

This edge part 11 has a plurality of cuts, which are in the form here of transverse sipes 3 that open both into the circumferential groove 2 and axially towards the outside of the tread. These transverse sipes 3 have a width Li equal to 1.0 mm, this width being measured on the tread surface in the new state between the opposing walls delimiting this sipe. These transverse sipes 3 have a depth identical to the depth of the circumferential groove 2. Each transverse sipe 3 is oriented in the tread such that, on the tread surface of the tread, its line is parallel to the axis of rotation of the tire. Each transverse sipe 3 is delimited by opposing walls 31, 32, one of said walls comprising a protruding protuberance 5. These transverse sipes cut into a plurality of blocks 4.

Each protuberance 5 formed in a transverse sipe 3 has an active surface 50 (visible in FIG. 2) that is able to come into contact with the opposing wall 32 of the groove in the contact patch in contact with the ground. The active surface of each protuberance 5 is separated by a thin slot 6 of width Hi, this width Hi being measured on the tire in a state not mounted on a rim. The width Hi of the slot is equal to 0.6 mm in the present case.

Figure 2:
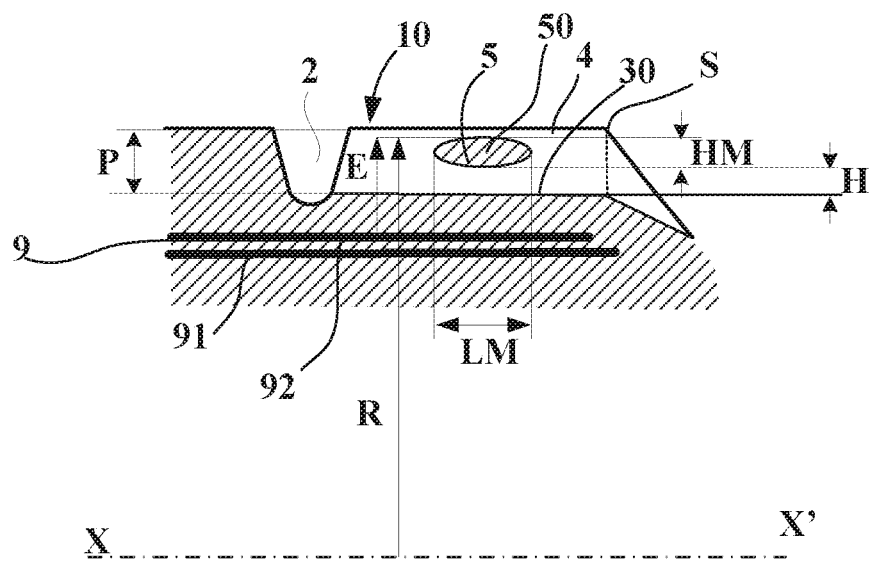
FIG. 2 shows a meridional section along a line II-II indicated in FIG. 1.

As can be seen in FIG. 2, which shows a cross section on the line II-II shown in FIG. 1, this tire comprises a crown reinforcement 9 formed by two reinforcing layers 91, 92. Furthermore, each protuberance 5 of one and the same transverse sipe 3 has a maximum transverse length LM equal to at least twice the maximum height HM of this protuberance measured in the direction of the depth P of the transverse groove.

Moreover, the area of the active surface 50 of each protuberance, which is equal here to the area of the section of each protuberance as seen in cross section, is at least equal to 10% and at most equal to 50% of the area of the wall surface on which the protuberance 5 is formed. This wall surface extends between the circumferential groove 2, the bottom 30 of the transverse groove 3 and a segment S, shown by way of a dotted line in FIG. 2, that is perpendicular to the axis of rotation and passes through the axially outermost point of the block 4 that comes into contact with the road surface under nominal use conditions of the tire.

Furthermore, there is a passage for water between the protuberance 5 and the bottom 30 of the transverse sipe 3, this passage having a height H at least equal to 10% of the depth P of the transverse sipe 3 (in the present case, this height H is equal to 40%).

In the case of the protuberance 5 shown, the radially outermost points are situated at a distance R from the axis of rotation that is indicated by the axis XX' in this FIG. 2, these same points being at a distance E from the radially outermost ply 92 of the crown reinforcement 9. This protuberance is formed in a slightly offset manner with respect to the tread surface 10 of the tread.

The area of an active surface is evaluated in projection in the circumferential direction on the mean meridian plane, that is to say a plane passing through the axis of rotation of the tire and through the mean circumferential position of the active surface. Similarly, the area of the wall surface on which at least one active surface is formed is evaluated in projection in the circumferential direction on the mean meridian plane of the groove in question.

Figure 3:
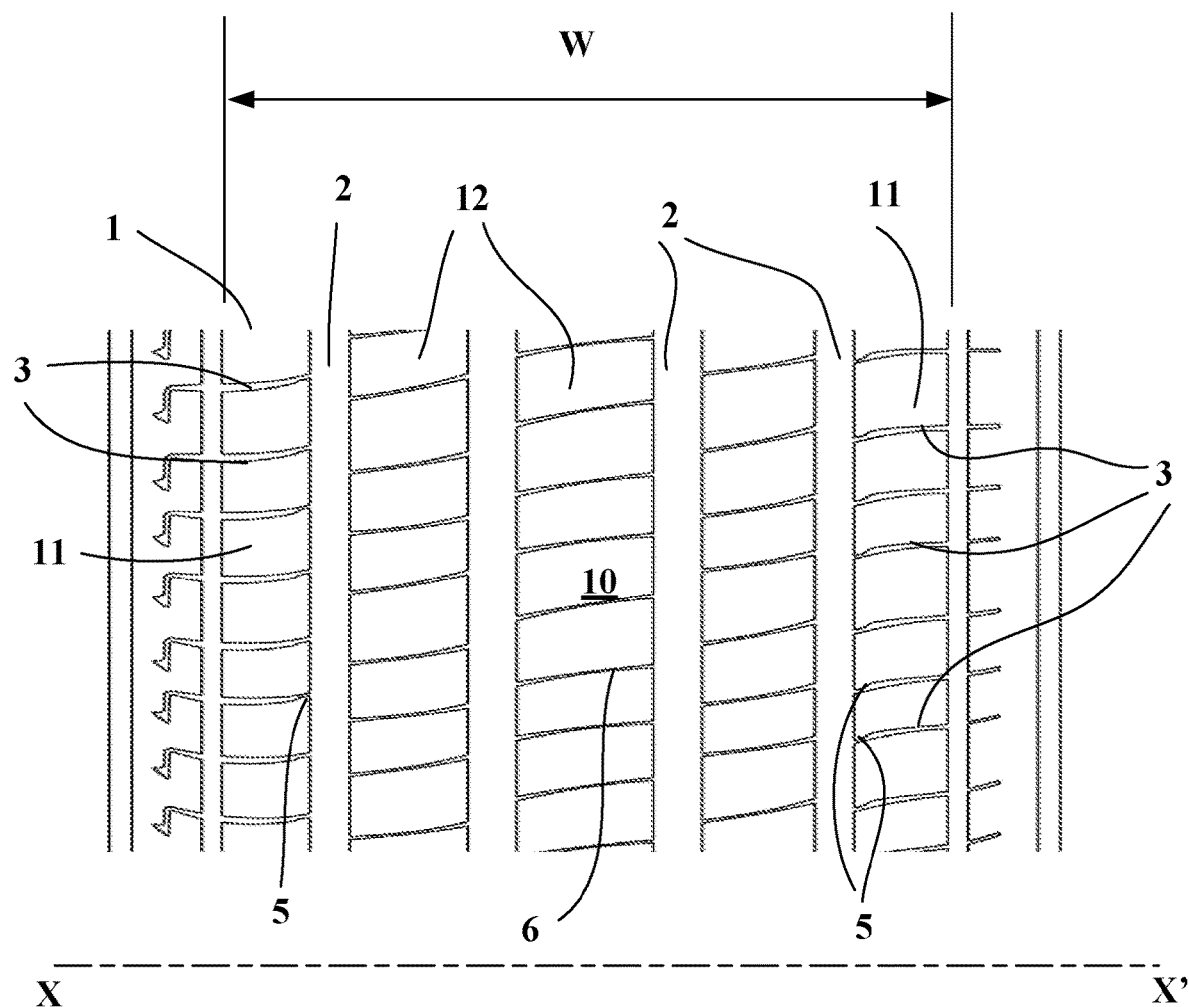
FIG. 3 shows a surface view of a tread of a tire of size 205/55 R 16 produced according to an embodiment of the invention.

FIG. 3 shows a surface view of a tread 1 of a tire of size 205/55 R 16.

This tread 1 is provided with a tread pattern comprising four circumferential grooves 2 that delimit three intermediate, circumferentially oriented ribs 12, these ribs 12 being delimited axially on the outside by edge parts 11 that axially delimit the tread over its width W.

Formed on each circumferential intermediate rib 12 are a plurality of oblique sipes 6 with a mean opening width equal to 0.8 mm.

Each edge part 11 comprises a plurality of sipes 3 of oblique mean orientation making a mean angle of around 15° with the transverse direction (that is to say with the axis of rotation of the tire indicated by the axis XX' in the figure). These oblique sipes 3 extend across the entire width of the edge part 11 and have an opening width equal to 0.8 mm. Formed locally on one of the opposing walls that each delimit oblique sipes 3 of the edge parts 11 is a protuberance 5 that locally reduces the opening width of the sipe to 0.3 mm. This protuberance 5 is formed close to the tread surface 10 of the tread (inward offset equal to 1 mm) and in the vicinity of the circumferential groove 2. This protuberance 5 extends in the direction of the thickness of the tread to a depth equal to 30% of the depth of the sipe 3.

The transverse volumetric void ratio in the new state of the tread 1 expresses the volume percentage of all the obliquely oriented sipes 3, 6 (that is to say ones that make an angle at most equal to 45° with the longitudinal or circumferential direction on the tire) compared with the volume of all the voids, transverse, oblique and circumferential. In the variant described, the total volumetric void ratio is equal to 23%, whereas the transverse volumetric void ratio in the new state of all the sipes/grooves formed in the intermediate ribs and in the edge parts is equal to 5%.

This tread is furthermore formed from a material as described in the application WO 2015/185395-A1, the formulation of which (in phr, that is to say in parts by weight per hundred parts of the elastomer matrix, which consists of all the elastomers present in the rubber composition) is given in the following table:

| Composition | phr |
|---|---|
| SBR (1) | 100 |
| Carbon black (2) | 3 |
| Silica (3) | 60 |
| Resin (4) | 30 |
| Antiozone wax | 1.8 |
| Antioxidant (5) | 2.7 |
| Silane (6) | 4.8 |
| Stearic acid | 2 |
| CBS (7) | 2.3 |
| DPG (8) | 2 |
| Sulfur | 1 |
| ZnO | 1 |

(1) SBR with 27% of stirene units and 24% of 1,2- units of the butadiene part (Tg = −48° C.) bearing a silanol function at the end of the elastomer chain;
(2) ASTM grade N234 (Cabot);
(3) "Zeosil 1165 MP" silica from Rhodia, "HDS" type;
(4) C$_5$ fraction/C$_9$ fraction resin ECR-373 from Exxon;
(5) N-(1,3-Dimethylbutyl)-N'-phenyl-p-phenylenediamine, from Flexsys;
(6) TESPT ("Si69" from Degussa);
(7) N-cyclohexyl-2-benzothiazolesulfenamide ("Santocure CBS" from Flexsys);
(8) Diphenylguanidine ("Perkacit" DPG from Flexsys).

This material has, measured in the cured state, the following physical characteristics:
  Shore A hardness, measured in accordance with the standard ASTM 2240, at a temperature of 23° C. (+ or −2° C.), a hygrometry at 50% (+ or −10%) and under a load of 50 N for a measuring time of 3 seconds, equal to 54,
  a loss of energy, measured at 60° C. in a rebound test at a set energy level at the sixth impact, equal to 18%,
  a glass transition temperature Tg, measured in accordance with standard ASTM D 5992-96, equal to −14° C.

By virtue of this combination of tread pattern and tread material, it has been possible to very substantially reduce the risks associated with the capturing of objects that may become aggressive in the tread by reducing the share of transverse voids while attaining a particularly advantageous rolling resistance performance.

Although the invention has been described with the aid of two examples, it should be understood that it is no way limited to these examples and can be subject to modifications while remaining within the scope of the claims.

The invention claimed is:

1. A tread for a passenger vehicle tire, comprising:
   at least one material that comes into contact with a road surface while the tire is running via a tread surface forming an external surface of the tread,
   edge parts axially delimiting said tread,
   at least one of these edge parts being provided with a plurality of transversely or obliquely oriented cuts having a width at most equal to 2 mm and a depth at least equal to 75% of the thickness of the tread that is adapted to be worn away, wherein more than half of the plurality of transversely or obliquely oriented cuts formed in the at least one of these edge parts comprising at least one protuberance that locally reduces the width of this cut to a width at least equal to 0.2 mm and at most equal to 0.5 mm,
   wherein the material of which the tread is comprised and which is adapted to come into contact with the road surface in the new state has the following physical characteristics:
   a Shore A hardness, measured in accordance with standard ASTM 2240 or DIN 53505, at a temperature of 23° C., at least equal to 48 and at most equal to 57,
   a loss at 60° C. at least equal to 12% and at most equal to 20%, a loss of energy at 60° C. by rebound at a set energy level measured at the sixth impact and the value of which, expressed in %, is equal to the difference between the energy supplied and the energy returned, divided by the energy supplied,
   a glass transition temperature Tg, measured in accordance with standard ASTM D 5992-96, at least equal to −20° C. and at most equal to −10° C.

2. The tread according to claim 1, wherein the Shore A hardness of the material of which it is comprised and which is adapted to come into contact with the road surface in the new state is at least equal to 50 and at most equal to 56.

3. The tread according to claim 1, wherein the glass transition temperature Tg of the material of which it is comprised and which is adapted to come into contact with the road surface in the new state is at least equal to −16° C. and at most equal to −12° C.

4. The tread according to claim 1, wherein the transversely or obliquely oriented cuts have a width at most equal to 1 mm.

5. The tread according to claim 1, wherein the protuberance(s) of a cut is/are located between a depth equal to 15% of the maximum depth of said cut and a depth equal to 70% of the maximum depth of said cut.

6. The tread according to claim 1, wherein the protuberance(s) is/are formed in one and the same face delimiting the cut.

7. A tire provided with the tread according to claim 1, wherein the transverse volumetric void ratio, measuring the void content in all of the transversely or obliquely oriented cuts, is at most equal to one quarter of the overall volumetric void ratio of the tread.

8. The tread according to claim 1, wherein each protuberance of a cut has a maximum transverse length equal to at least twice a maximum height the respective protuberance measured in a direction of the depth.

9. The tread according to claim 1, wherein an area of a cross section of each protuberance is at least equal to 10% and at most equal to 50% of an area of the wall surface on which the respective protuberance is formed.

10. The tread according to claim 1, wherein a passage is defined radially inside each protuberance, each passage has a height equal to at least 10% of the depth.

11. The tread according to claim 10, wherein a passage is defined radially inside each protuberance, each passage has a height equal to 40% of the depth.

12. The tread according to claim 1, wherein an area of a cross section of each protuberance is elliptical.

* * * * *